US011111893B2

(12) United States Patent
Brune et al.

(10) Patent No.: US 11,111,893 B2
(45) Date of Patent: *Sep. 7, 2021

(54) TAPPET ASSEMBLY FOR USE IN A HIGH-PRESSURE FUEL SYSTEM OF AN INTERNAL COMBUSTION ENGINE

(71) Applicant: GT TECHNOLOGIES, Westland, MI (US)

(72) Inventors: John E. Brune, Stockbridge, MI (US); Terence William Roberts, Jr., Northwood, OH (US); Tyler Austin Hamm, Trenton, MI (US)

(73) Assignee: GT TECHNOLOGIES, Westland, MI (US)

( * ) Notice: Subject to any disclaimer, the term of this patent is extended or adjusted under 35 U.S.C. 154(b) by 5 days.

This patent is subject to a terminal disclaimer.

(21) Appl. No.: 16/897,042

(22) Filed: Jun. 9, 2020

(65) Prior Publication Data
US 2020/0300203 A1    Sep. 24, 2020

Related U.S. Application Data

(63) Continuation-in-part of application No. 16/450,105, filed on Jun. 24, 2019, now Pat. No. 10,697,413.
(Continued)

(51) Int. Cl.
*F02M 59/10* (2006.01)
*F01L 1/14* (2006.01)
*F16H 25/14* (2006.01)

(52) U.S. Cl.
CPC .......... *F02M 59/102* (2013.01); *F16H 25/14* (2013.01)

(58) Field of Classification Search
CPC .... F02M 59/102; F02M 59/44; F02M 45/063; F16H 25/14; F16H 53/06; F01L 2105/00; F01L 1/14; F01L 1/143
(Continued)

(56) References Cited

U.S. PATENT DOCUMENTS

| 4,335,685 A | 6/1982 | Clouse |
| 7,793,583 B2 | 9/2010 | Radinger et al. |
| 8,235,018 B2 | 8/2012 | Dorn et al. |

(Continued)

FOREIGN PATENT DOCUMENTS

| CN | 205618278 U | 10/2016 |
| DE | 102011085243 A1 | 5/2013 |

(Continued)

OTHER PUBLICATIONS

International Search Report and Written Opinion of the International Searching Authority for PCT International Application No. PCT/US2019/035382 dated Sep. 16, 2020.

*Primary Examiner* — Devon C Kramer
*Assistant Examiner* — Kelsey L Stanek
(74) *Attorney, Agent, or Firm* — Howard & Howard Attorneys PLLC

(57) ABSTRACT

A tappet assembly for use in translating force between a camshaft lobe and a fuel pump assembly via reciprocal movement within a tappet cylinder having a guide slot. The tappet assembly comprises a tappet body having a shelf and defining a pair of apertures, and a follower assembly. The follower assembly has a shaft, a first bearing and a second bearing, each supported on the shaft for engaging the camshaft lobe. A beam is further supported on the shaft between the first and second bearings and has a platform for engaging the fuel pump assembly. The shaft is disposed in the pair of apertures of the tappet body and the beam is arranged in the tappet body and engaged with the shelf.

20 Claims, 15 Drawing Sheets

Related U.S. Application Data which is a continuation-in-part of application No. 16/431,004, filed on Jun. 4, 2019, now Pat. No. 10,837,416.

(60) Provisional application No. 62/680,287, filed on Jun. 4, 2018.

(58) Field of Classification Search
USPC ............ 123/90.48, 90.49, 90.5; 92/129, 187, 92/165 PR; 74/569
See application file for complete search history.

(56) References Cited

U.S. PATENT DOCUMENTS

| | | | |
|---|---|---|---|
| 8,474,427 B2 | 7/2013 | Dorn et al. | |
| 8,522,643 B2 | 9/2013 | Dorn et al. | |
| 8,863,716 B2 | 10/2014 | Dorn et al. | |
| 8,875,676 B2* | 11/2014 | Geyer | F01L 1/14 123/90.48 |
| D739,440 S | 9/2015 | Cornett et al. | |
| 10,697,413 B2* | 6/2020 | Brune | F02M 59/102 |
| 2008/0190237 A1 | 8/2008 | Radinger et al. | |
| 2011/0265752 A1* | 11/2011 | Dorn | F04B 53/22 123/90.48 |
| 2012/0125277 A1* | 5/2012 | Chambonneau | F04B 1/0417 123/90.48 |
| 2012/0152187 A1* | 6/2012 | Cornett | F01L 1/143 123/90.5 |
| 2012/0234277 A1* | 9/2012 | Dorn | F01L 1/146 123/90.48 |
| 2013/0104818 A1 | 5/2013 | Dorn et al. | |
| 2013/0213181 A1* | 8/2013 | Dorn | F02M 59/102 74/569 |
| 2015/0090209 A1* | 4/2015 | Berruet | F02M 37/06 123/90.26 |
| 2016/0084116 A1* | 3/2016 | Ludwig | F01L 1/14 123/90.48 |
| 2016/0091073 A1 | 3/2016 | Berruet et al. | |
| 2016/0160986 A1* | 6/2016 | Berruet | F04B 9/042 74/569 |
| 2016/0230868 A1* | 8/2016 | Champalou | F16H 53/06 |
| 2017/0016418 A1* | 1/2017 | Brune | F02M 59/06 |
| 2019/0368455 A1* | 12/2019 | Brune | F04B 1/0426 |
| 2019/0368456 A1 | 12/2019 | Brune et al. | |

FOREIGN PATENT DOCUMENTS

| | | |
|---|---|---|
| JP | H11294117 A | 10/1999 |
| JP | 2018044506 A | 3/2018 |

* cited by examiner

TAPPET ASSEMBLY FOR USE IN A HIGH-PRESSURE FUEL SYSTEM OF AN INTERNAL COMBUSTION ENGINE

CROSS-REFERENCE TO RELATED APPLICATIONS

The present application is a continuation-in-part of U.S. patent application Ser. No. 16/450,105 filed Jun. 24, 2019, which is a continuation-in-part of U.S. patent application Ser. No. 16/431,004, filed on Jun. 4, 2019, which claims priority to and all the benefits of U.S. Provisional Patent Application No. 62/680,287, filed on Jun. 4, 2018, all of which are hereby expressly incorporated herein by reference in their entirety.

BACKGROUND

Conventional internal combustion engines typically include one or more camshafts in rotational communication with a crankshaft supported in a block, one or more intake and exhaust valves driven by the camshafts and supported in a cylinder head, and one or more pistons driven by the crankshaft and supported for reciprocal movement within cylinders of the block. The pistons and valves cooperate to regulate the flow and exchange of gases in and out of the cylinders of the block so as to effect a complete thermodynamic cycle in operation. To this end, a predetermined mixture of air and fuel is compressed by the pistons in the cylinders, is ignited and combusts, which thereby moves the piston within the cylinder to transfer energy to the crankshaft. The mixture of air and fuel can be delivered in a number of different ways, depending on the specific configuration of the engine.

Irrespective of the specific configuration of the engine, contemporary engine fuel systems typically include a pump adapted to pressurize fuel from a source (e.g., a fuel tank) and to direct pressurized fuel to one or more fuel injectors selectively driven by an electronic controller. Here, the fuel injectors atomize the pressurized fuel, which promotes a substantially homogenous mixture of fuel and air used to effect combustion in the cylinders of the engine.

In so-called "port fuel injection" (PFI) gasoline fuel systems, the fuel injectors are arranged up-stream of the intake valves of the cylinder head, are typically attached to an intake manifold, and are used to direct atomized fuel toward the intake valves which mixes with air traveling through the intake manifold and is subsequently drawn into the cylinders. In conventional PFI gasoline fuel systems, a relatively low fuel pressure of 4 bar (approximately 58 psi) is typically required at the fuel injectors. Because the pressure demand of PFI gasoline fuel systems is relatively low, the pump of a PFI gasoline fuel system is typically driven with an electric motor.

In order to increase the efficiency and fuel economy of conventional internal combustion engines, the current trend in the art involves so-called "direct fuel injection" (DFI) fuel system technology, in which the fuel injectors introduce atomized fuel directly into the cylinder of the block (rather than up-stream of the intake valves) so as to effect improved control and timing of the thermodynamic cycle of the engine. To this end, modern gasoline DFI fuel systems operate at relatively high fuel pressures, for example 500 bar or higher (approximately 7300 psi). Because the pressure demand of DFI fuel systems is relatively high, a high-pressure fuel pump assembly which is mechanically driven by a rotational movement of a prime mover of the engine (e.g., one of the camshafts) is typically employed. Thus, in many embodiments, the same camshaft used to regulate valves in the cylinder head is also used to drive the high-pressure fuel pump assembly in DFI fuel systems. To this end, one of the camshafts typically includes an additional lobe that cooperates with a tappet supported in a housing to translate rotational movement of the camshaft lobe into linear movement of the high-pressure fuel pump assembly.

The high-pressure fuel pump assembly is typically removably attached to the housing with fasteners. The housing of the high-pressure fuel pump assembly may be formed as a discrete component, or may be realized as a part of the cylinder head, and includes a tappet cylinder in which the tappet is supported for reciprocating movement.

The tappet typically includes a bearing which engages the lobe of the camshaft, and a body which supports the bearing and is disposed in force-translating relationship with the high-pressure fuel pump assembly. Here, the high-pressure fuel pump assembly typically includes a spring-loaded piston which is pre-loaded against the tappet body when the high-pressure fuel pump assembly is attached to the housing. Thus, rotational movement of the lobe of the camshaft moves the tappet along the tappet cylinder of the housing which, in turn, translates force to the piston of the high-pressure fuel pump assembly to displace and pressurize fuel. As the lobe of the camshaft continues to rotate, potential energy stored in the spring-loaded piston of the high-pressure fuel pump assembly urges the tappet back down the tappet cylinder such that engagement is maintained between the bearing of the tappet and the lobe of the camshaft.

Each of the components of an internal combustion engine high-pressure fuel system of the type described above must cooperate to effectively translate movement from the lobe of the camshaft so as to operate the high-pressure fuel pump assembly at a variety of engine rotational speeds and operating temperatures so as to ensure proper performance. In addition, each of the components must be designed not only to facilitate improved performance and efficiency, but also so as to reduce the cost and complexity of manufacturing and assembling the fuel system, as well as reduce wear in operation. While internal combustion engine high-pressure fuel systems known in the related art have generally performed well for their intended purpose, there remains a need in the art for a high-pressure fuel system that has superior operational characteristics, and, at the same time, reduces the cost and complexity of manufacturing the components of the fuel system.

SUMMARY

The present invention overcomes the disadvantages in the related art in a tappet assembly for use in translating force between a camshaft lobe and a fuel pump assembly via reciprocal movement within a tappet cylinder having a guide slot. The tappet assembly includes a follower assembly having a shaft and first and second bearings rotatably supported by the shaft for engaging the camshaft lobe. The tappet assembly further includes a beam disposed between the first and second bearings and coupled to the follower assembly. The beam includes a platform for engaging the high-pressure fuel pump assembly. The tappet assembly further includes a tappet body having a shelf wherein the beam is arranged in the tappet body and engaged with the shelf.

In this way, the tappet assembly of the present invention significantly reduces the complexity of manufacturing high-pressure fuel systems. Moreover, the present invention reduces the cost of manufacturing high-pressure fuel systems that have superior operational characteristics, such as improved engine performance, control, and efficiency, as well as reduced noise, vibration, engine wear, emissions, and packaging size.

BRIEF DESCRIPTION OF THE DRAWINGS

Other advantages of the present invention will be readily appreciated as the same becomes better understood by reference to the following detailed description when considered in connection with the accompanying drawings.

DETAILED DESCRIPTION

Figure 1:
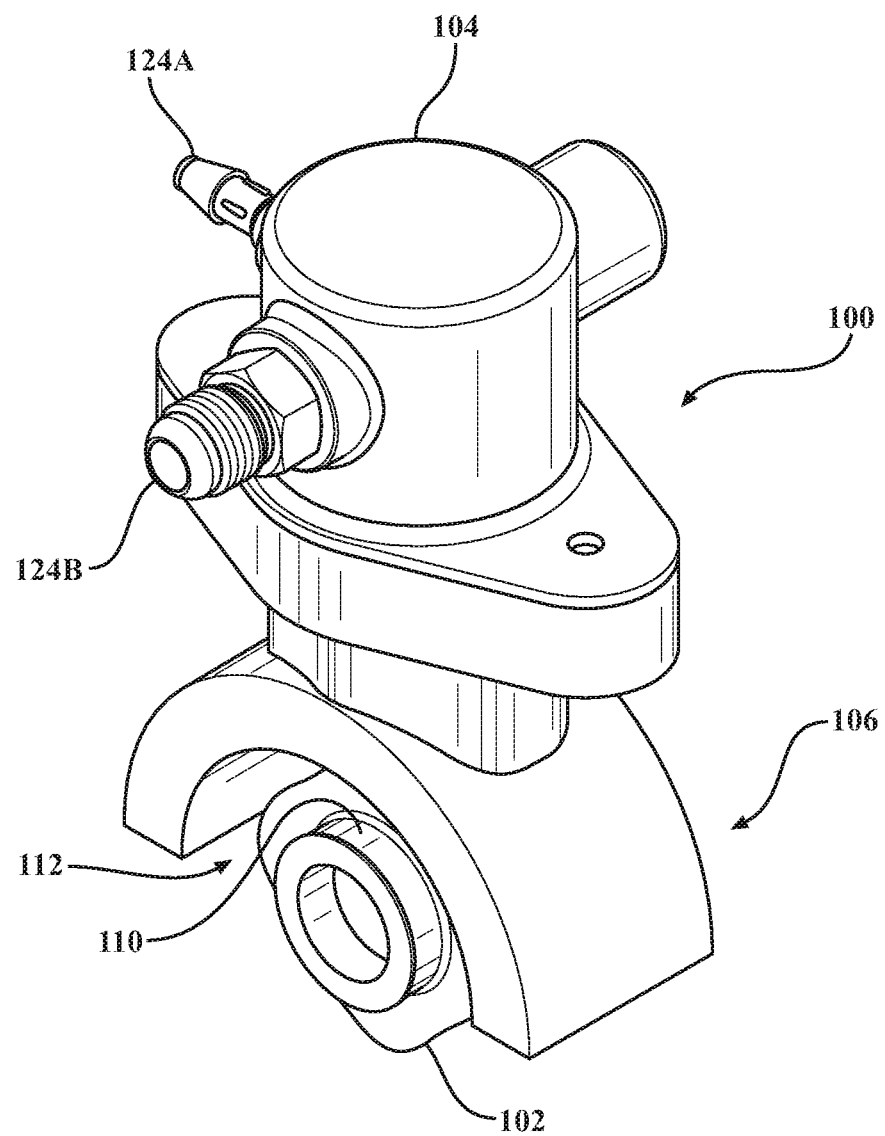
FIG. 1 is a perspective view of a high-pressure fuel system, shown depicting portions of a fuel pump assembly, a camshaft lobe, and a housing.
Figure 2:
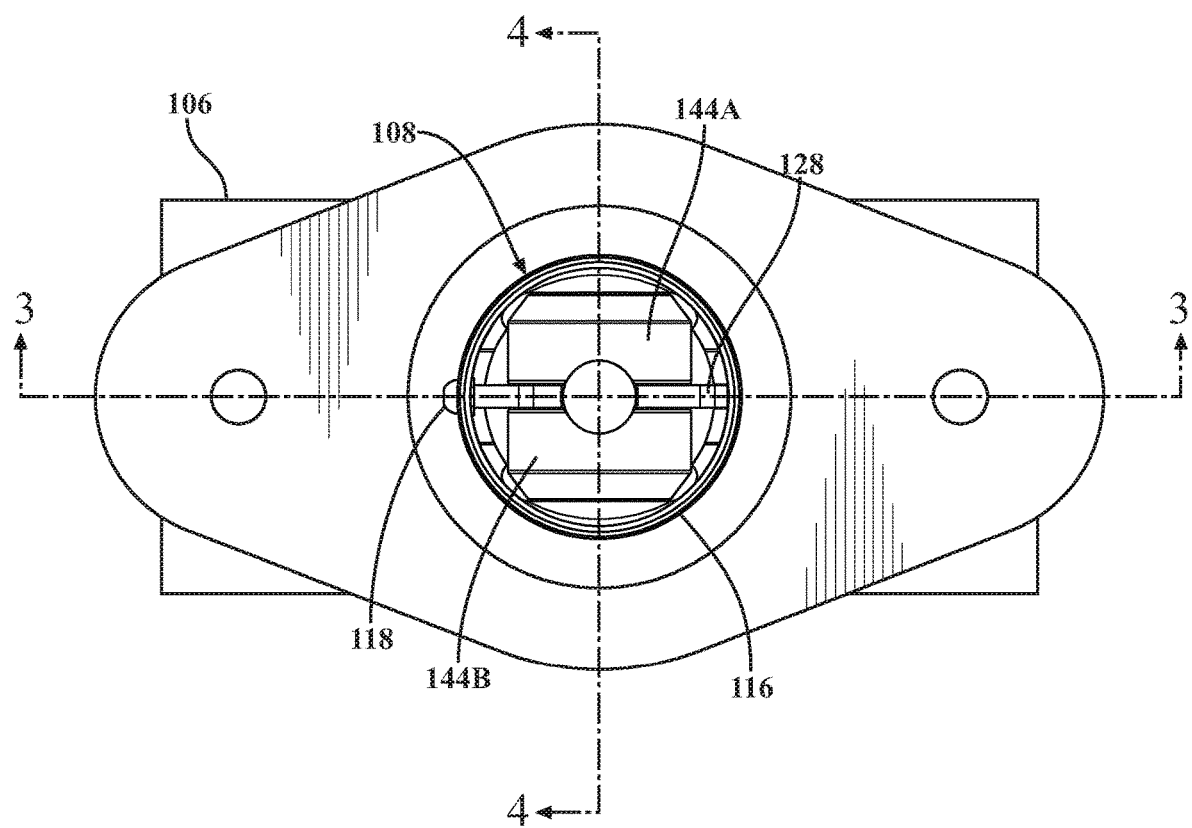
FIG. 2 is a top-side plan view of portions of the high-pressure fuel system of FIG. 1, shown without the fuel pump assembly and shown depicting a tappet assembly according to a first embodiment of the present invention supported within a tappet cylinder of the housing.

Referring now to the drawings, wherein like numerals are used to designate like structure, portions of a high-pressure fuel system for an internal combustion engine are generally depicted at 100 in FIGS. 1-5. The high-pressure fuel system 100 includes a camshaft lobe 102, a high-pressure fuel pump assembly 104, a housing 106, and a tappet assembly 108. Each of these components will be described in greater detail below.

Figure 3:
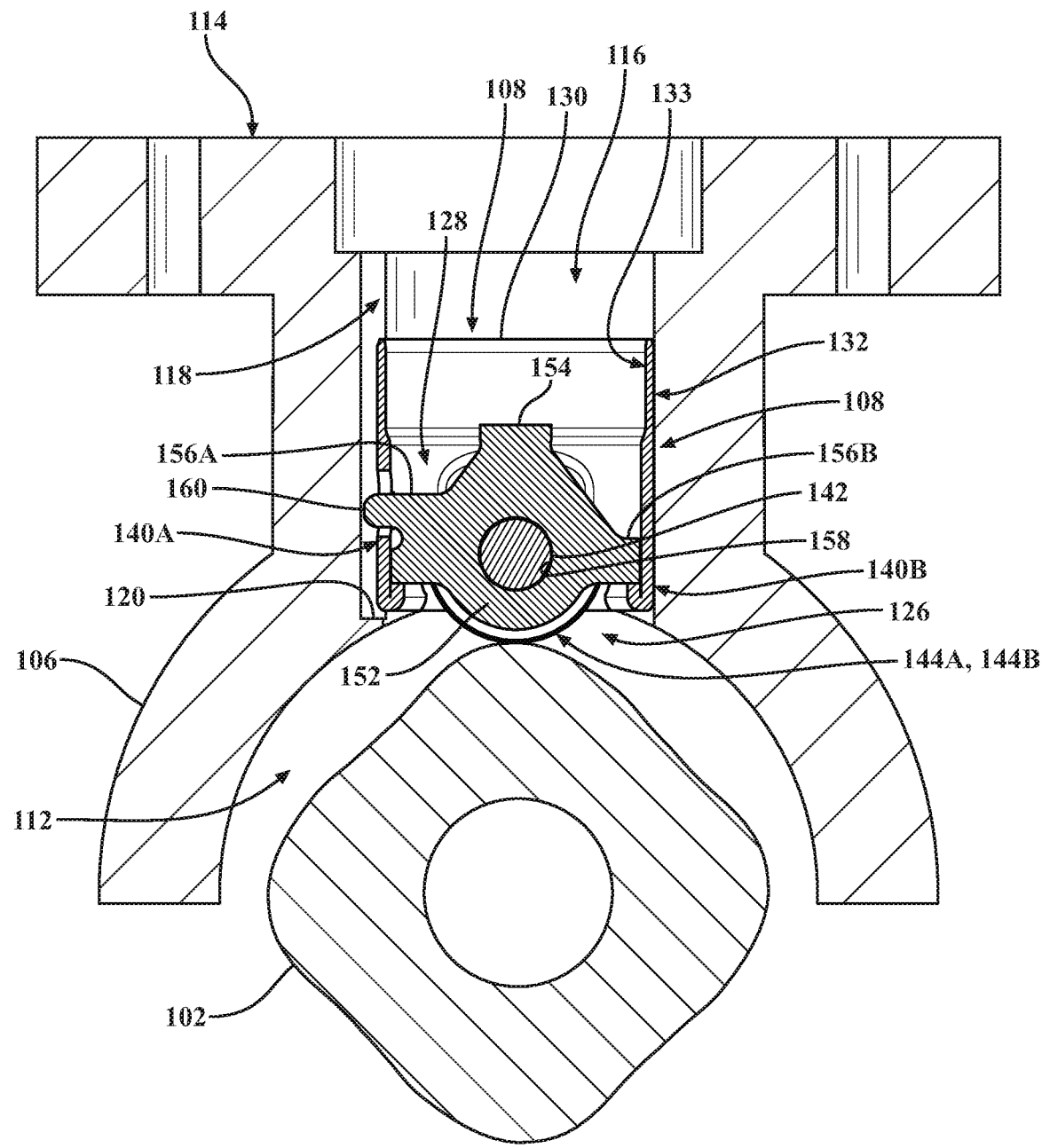
FIG. 3 is a section view taken along line 3-3 in FIG. 2, shown depicting portions of the housing, the tappet assembly, and the camshaft lobe.

The camshaft lobe 102 is typically integrated with a camshaft 110 rotatably supported in a cylinder head or engine block of an internal combustion engine (not shown, but generally known in the related art). As is best shown in FIG. 3, the illustrated camshaft lobe 102 has a generally rounded eccentric profile and is used to drive the high-pressure fuel pump assembly 104, as described in greater detail below. Here, four camshaft lobes 102 are arranged in a rounded-rectangular pattern within the housing 106 and rotate within a housing chamber 112 defined by the housing 106.

For the purposes of clarity and consistency, only portions of the camshaft 110, the housing 106, and the housing chamber 112 that are disposed adjacent the camshaft lobe 102 are illustrated herein. Thus, it will be appreciated that the camshaft 110, housing 106, and/or the housing chamber 112 could be configured or arranged in a number of different ways sufficient to cooperate with the high-pressure fuel pump assembly 104 without departing from the scope of the present invention. Specifically, the camshaft 110 and camshaft lobe 102 illustrated herein may be integrated with or otherwise form a part of a conventional engine valvetrain system configured to regulate the flow of gases into and out of the engine (not shown, but generally known in the related art). Moreover, it will be appreciated that the camshaft 110 and/or the camshaft lobe 102 could be configured, disposed, or supported in any suitable way sufficient to operate the high-pressure fuel pump assembly 104 without departing from the scope of the present invention. Further, while the camshaft lobe 102 described herein receives rotational torque directly from the engine, those having ordinary skill in the art will appreciate that the camshaft lobe 102 could be disposed in rotational communication with any suitable prime mover sufficient to operate the high-pressure fuel pump assembly 104 without departing from the scope of the present invention.

As noted above, only the portions of the housing 106 and housing chamber 112 adjacent to the camshaft lobe 102 are illustrated throughout the drawings. Those having ordinary skill in the art will appreciate that the housing 106 and housing chamber 112 illustrated in FIGS. 1-5 could be formed or otherwise supported independent of the engine, or could be integrated with any suitable portion of the engine or another part of a vehicle powertrain without departing from the scope of the present invention. The housing 106 includes a flange 114, which is adapted to releasably secure the high-pressure fuel pump assembly 104, such as with bolts or other fasteners (not shown, but generally known in the related art). The housing 106 also includes a tappet cylinder 116, which extends between the housing chamber 112 and the flange 114. Here, the tappet assembly 108 is supported for reciprocal movement along the tappet cylinder 116 of the housing 106, as described in greater detail below. The tappet cylinder 116 also includes a guide slot 118, which extends between the flange 114 and the housing chamber 112 for indexing the angular position of the tappet assembly 108 with respect to the camshaft lobe 102 (see FIGS. 2, 3, and 5). As is best shown in FIG. 3, the guide slot 118 extends to a guide slot end 120 disposed adjacent to and spaced from the housing chamber 112. It will be appreciated that the guide slot end 120 helps prevent the tappet assembly 108 from inadvertently falling into the housing chamber 112 in the absence of the camshaft 110 (e.g., during engine assembly and/or disassembly).

Figure 5:
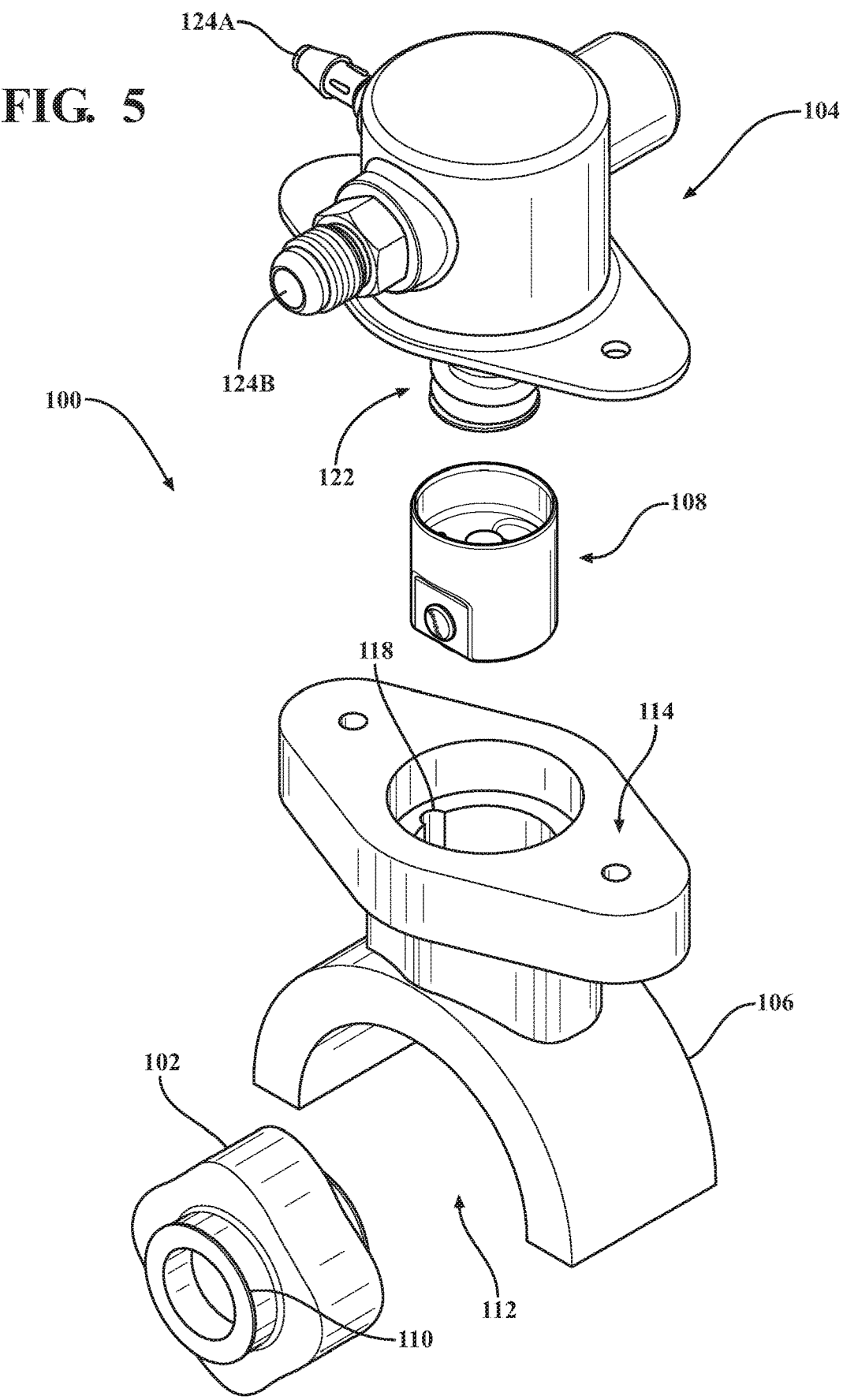
FIG. 5 is an exploded perspective view of the high-pressure fuel system of FIG. 1, shown with the camshaft lobe, the fuel pump assembly, and the first embodiment of the tappet assembly of FIGS. 2-4 spaced from the housing.

As shown in FIG. 5, the high-pressure fuel pump assembly 104 includes a spring-loaded piston, generally indicated at 122, which is pre-loaded against the tappet assembly 108 when the high-pressure fuel pump assembly 104 is attached to the flange 114 of the housing 106. The high-pressure fuel pump assembly 104 includes a low-pressure port 124A and a high-pressure port 124B. The low-pressure port 124A is typically disposed in fluid communication with a source of a fuel such as a fuel tank or a conventional low-pressure fuel system (not shown, but generally known in the related art). Similarly, the high-pressure port 124B is typically disposed in fluid communication with a fuel injector used to facilitate admission of fuel into the engine (not shown, but generally known in the related art). However, those having ordinary skill in the art will appreciate that the high-pressure fuel pump assembly 104 could be configured in any suitable way, with any suitable number of ports, components, and the like, without departing from the scope of the present invention.

Rotational movement of the camshaft lobe 102 effects reciprocal movement the tappet assembly 108 along the tappet cylinder 116 of the housing 106 which, in turn, translates force to the spring-loaded piston 122 of the high-pressure fuel pump assembly 104 so as to pressurize fuel across the ports 124A, 124B. As the camshaft lobe 102 continues to rotate, potential energy stored in the spring-loaded piston 122 of the high-pressure fuel pump assembly 104 urges the tappet assembly 108 back down the tappet cylinder 116 so as to ensure proper engagement between the tappet assembly 108 and the camshaft lobe 102, as described in greater detail below.

As noted above, two embodiments of the tappet assembly of the present invention are illustrated throughout the drawings. As will be appreciated from the subsequent description below, each of these embodiments are configured according to the present invention and facilitate translating force between the camshaft lobe 102 of the camshaft 110 and the spring-loaded piston 122 of the high-pressure fuel pump assembly 104 to effect operation of the high-pressure fuel system 100 (see FIGS. 1-5). While the specific structural differences between the two embodiments will be described in detail herein, for the purposes of clarity and consistency, subsequent discussion of the tappet assembly 108 will initially refer to a first embodiment.

Referring now to FIGS. 2-11, the first embodiment of the tappet assembly 108 is shown. The tappet assembly 108 generally includes a follower assembly 126, a beam 128, and a tappet body 130, each of which will be described in greater detail below.

Figure 6:
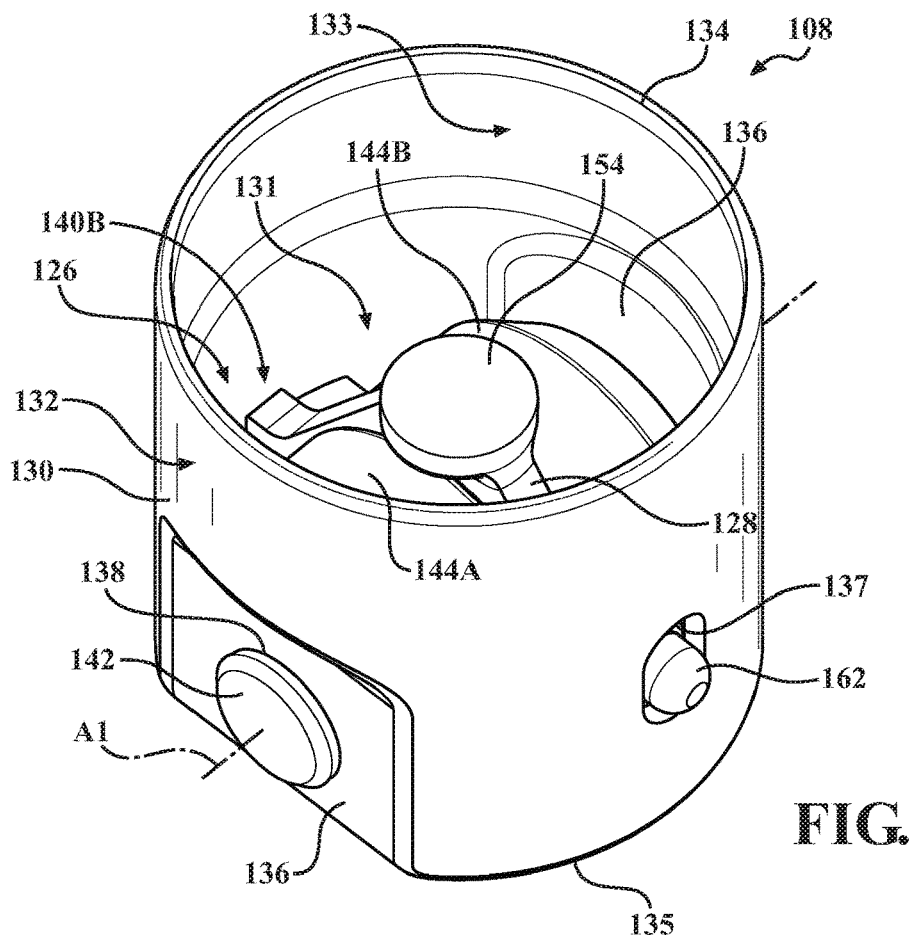
FIG. 6 is a perspective view of the first embodiment of the tappet assembly of FIGS. 2-5.
Figure 7:
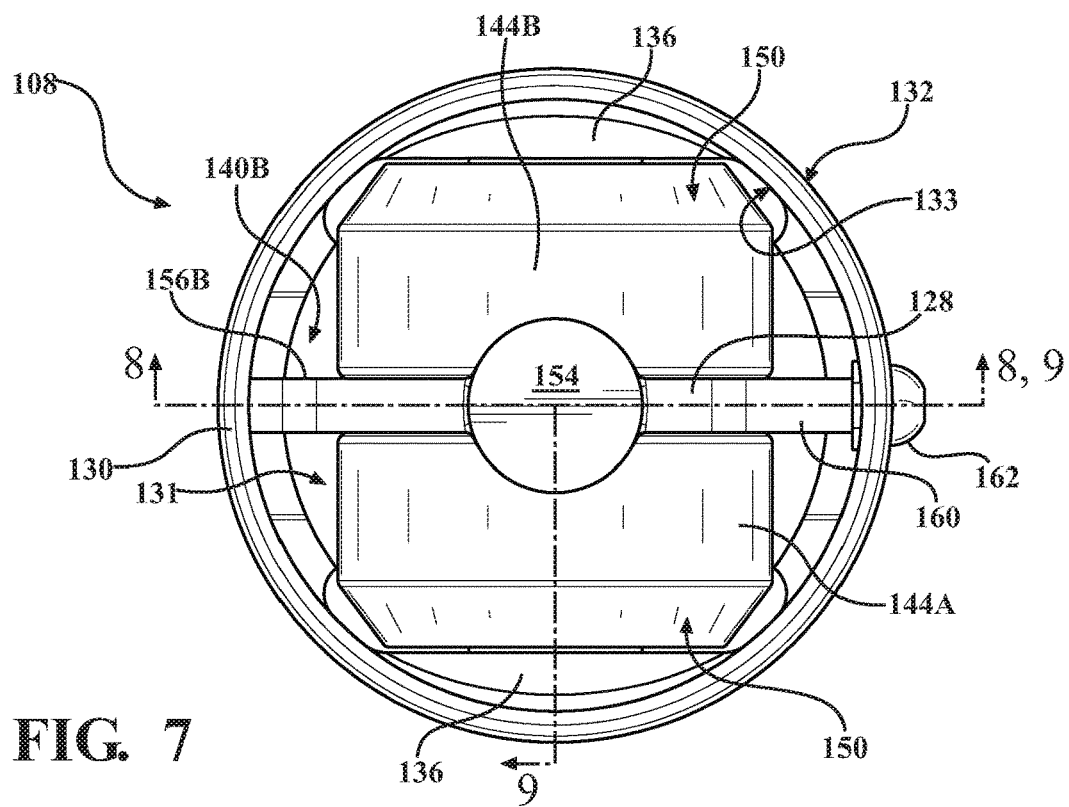
FIG. 7 is a top-side plan view of the first embodiment of the tappet assembly of FIG. 6, shown having a follower assembly supported within a tappet body.

As is best shown in FIGS. 6 and 7, the tappet body 130 of the tappet assembly 108 has an outer surface 132 and an inner surface 133, each of which have a generally annular profile to define a tubular shape of the tappet body 130 and an interior 131. The tappet body 130 extends between a first end 134 and a second end 135, the first end 134 oriented toward the high-pressure fuel pump assembly 104 and the second end 135 oriented toward the camshaft 110.

Two indented walls 136 are formed on the tappet body 130 and are diametrically opposed from each other. An aperture 138 is formed in each indented wall 136 extending from the outer surface 132 to the inner surface 133 (see also FIG. 4). The apertures 138 each have a substantially circular profile, are aligned with each other about an aperture axis A1 (see FIG. 6) and cooperate to support the follower assembly 126 in the interior 131 of the tappet body 130, as described in greater detail below.

Figure 8:
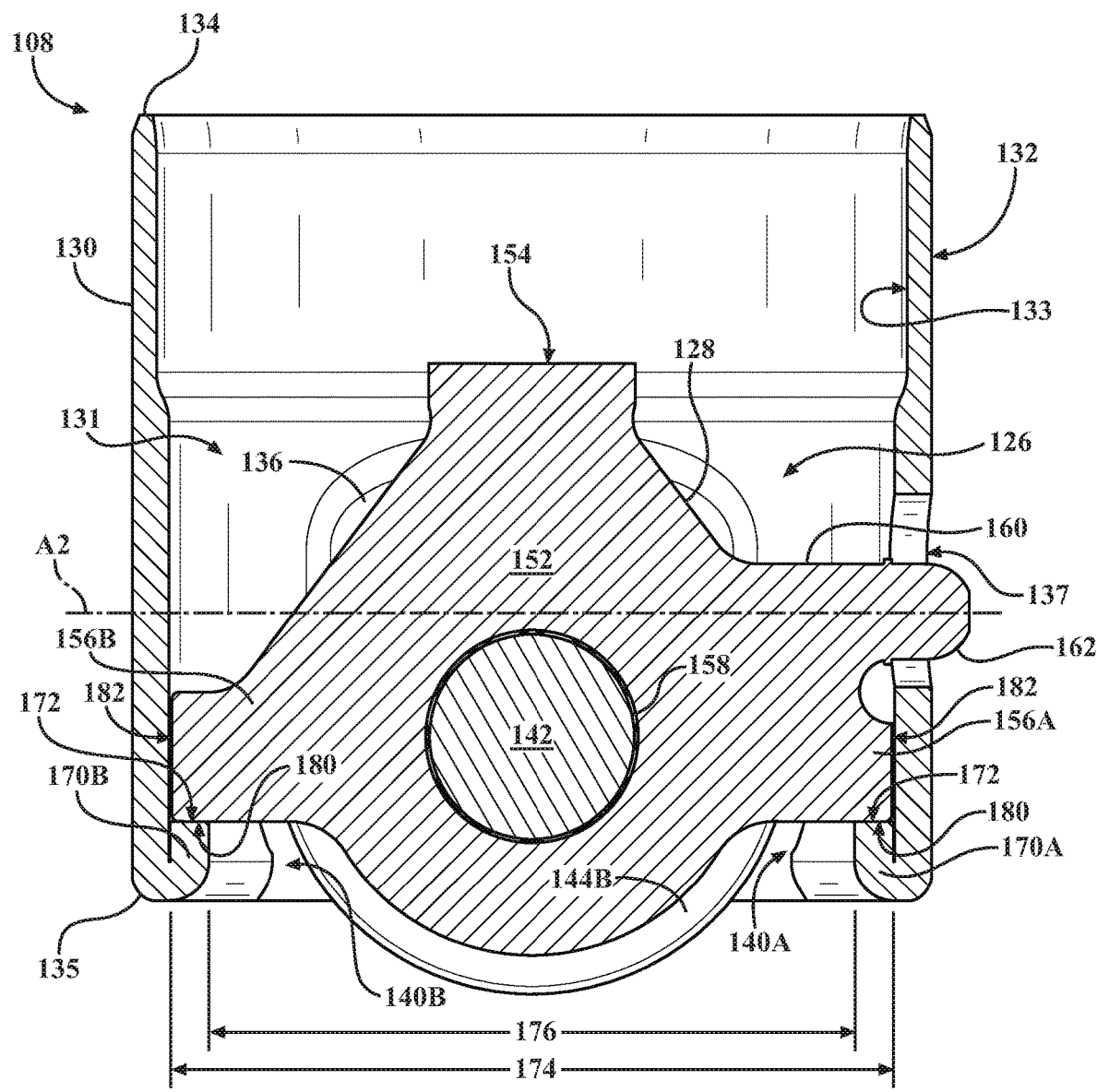
FIG. 8 is a cross-sectional view of the first embodiment of the tappet assembly taken along line 8-8 of FIG. 7.
Figure 9:
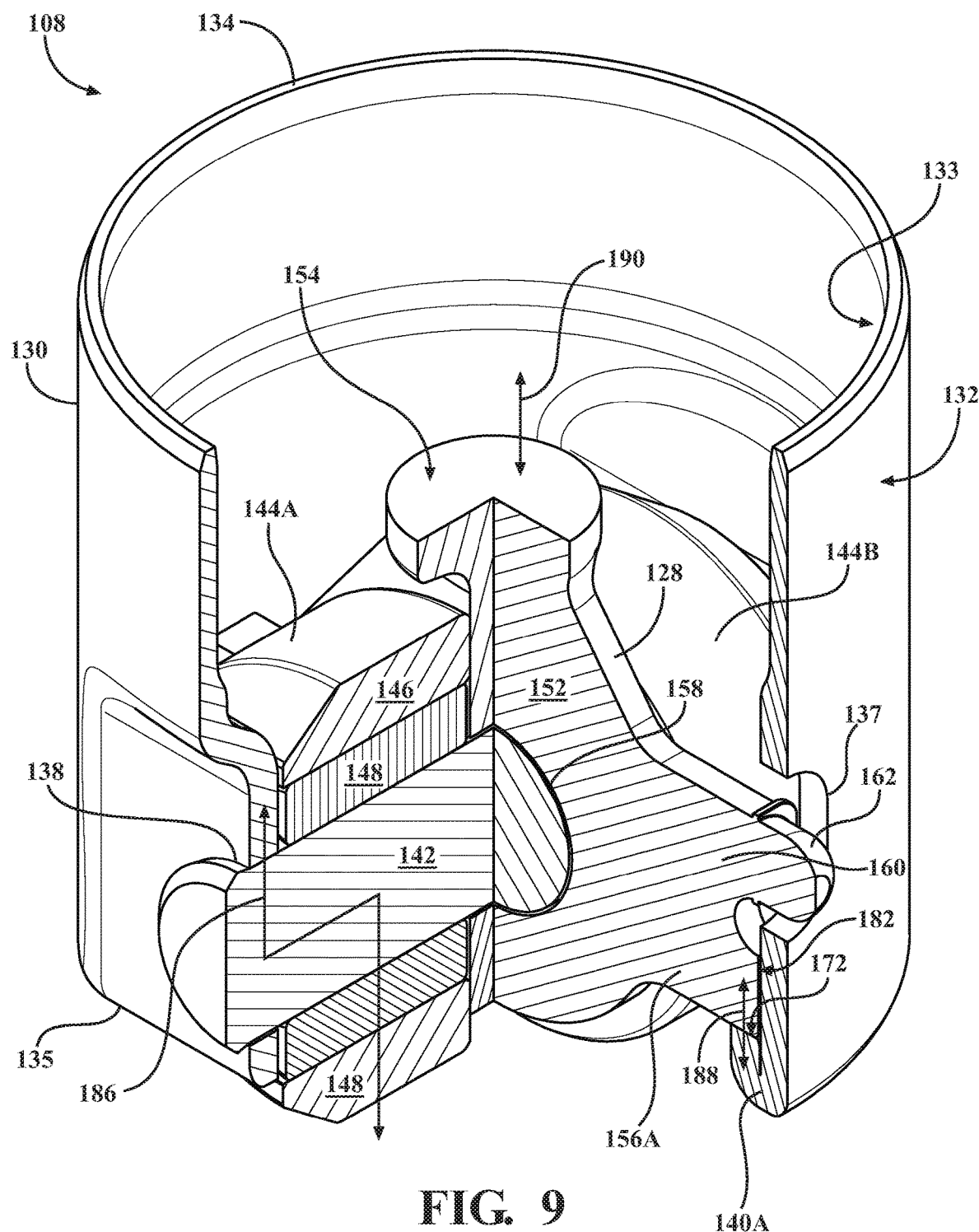
FIG. 9 is an offset section view of the first embodiment of the tappet assembly taken along line 9-9 of FIG. 7 and showing three force paths.
Figure 10:
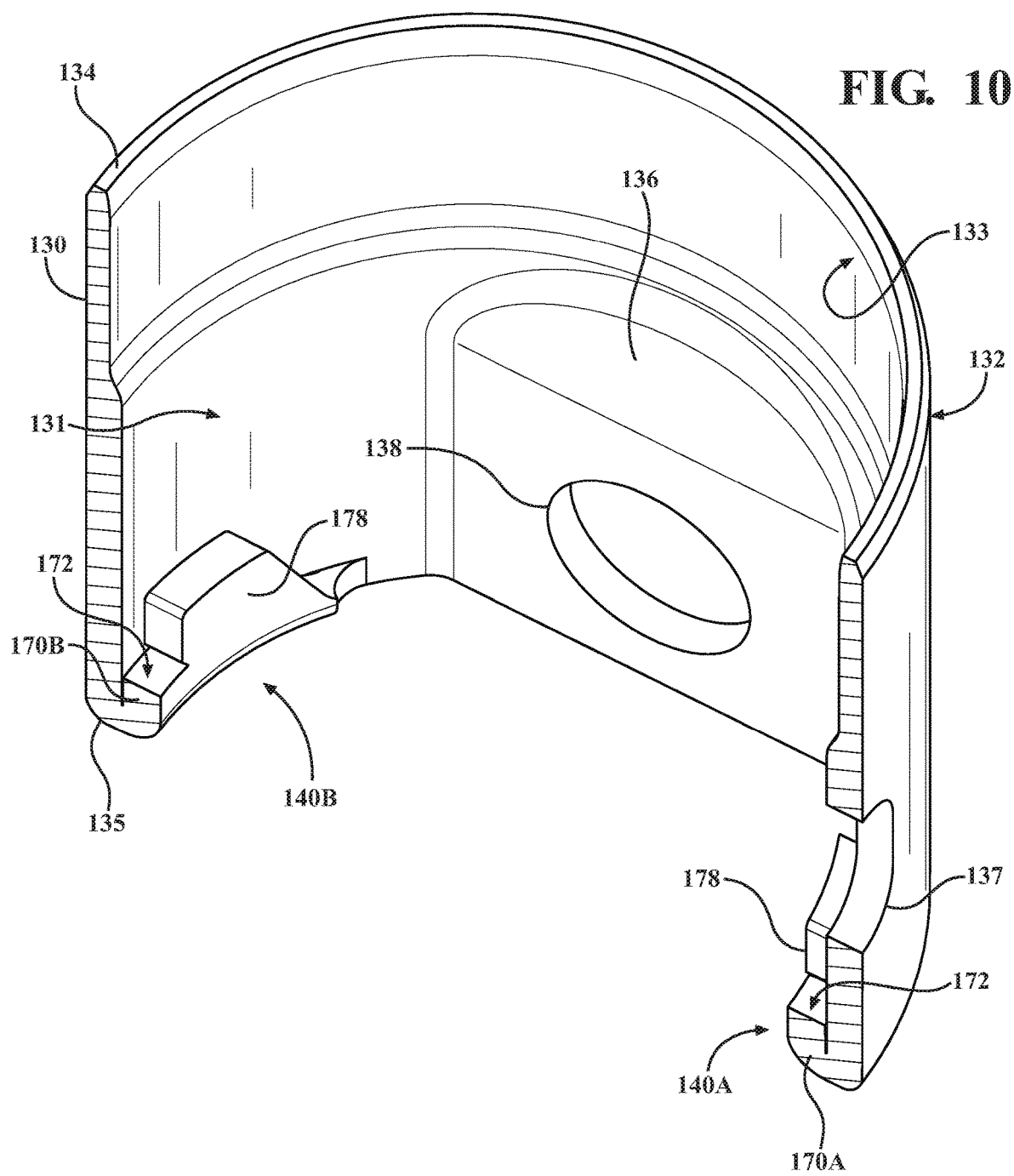
FIG. 10 is a cross-sectional perspective view of the tappet body of FIG. 8 with the follower assembly removed.

Referring now to FIGS. 8-10, the interior 131 of the tappet body 130 is shown including at least one shelf 140A, 140B adjacent to the second end 135. Here, the at least one shelf is further defined as a first shelf 140A and a second shelf 140B, each shelf 140A, 140B arranged on an opposing since of the tappet body 130. The first shelf 140A and the second shelf 140B each protrude from the inner surface 133 of the tappet body 130 into the interior 131. The interior 135 of the tappet body 130 defines a first width 174 between opposing sides of the inner surface 133, i.e. 180° from each other. A second width 176 is defined between the first shelf 140A and the second shelf 140B, the second width 176 is less than the first width 174. Said differently, the shelves 140A, 140B reduce an inner diameter of the tappet body 130 at the second end 135.

In the first embodiment, the shelves 140A, 140B are formed at the second end 135 of the tappet body 130 and each shelf 140A, 140B includes a shelf body 170A, 170B and a support surface 172. As will be discussed in further detail below, the shelves 140A, 140B engage the beam 128 for transferring force from the fuel pump assembly 104 to the camshaft lobe 102. The second end 135 of the tappet body 130 may be defined by a folded edge, which is folded to define the shelves 140A, 140B. Said differently, each shelf 140A, 140B is formed by folding a portion of the tappet body 130 toward the first end 134, which defines the second end 135 of the tappet body 130. The shelf body 170A, 170B is coupled to the second end 135 of the tappet body 130 and is folded so as to extend toward the first end 134. The support surface 172 is defined on each shelf 170A, 170B and is generally parallel to the aperture axis A1 for engaging the beam 128 of the follower assembly 126.

Best shown in FIG. 10, the shelves 140A, 140B may further comprise a wall portion 178 extending from the support surface 172 toward the first end 134 of the tappet body 130. The wall portion 178 is arranged adjacent to the beam 128 and perpendicular to the support surface 172 to engage the beam 128 (discussed below) to prevent movement of the beam 128 relative to the shelves 140A, 140B. The wall portion 178 may alternatively be formed onto the inner surface 133 protruding into the interior 131.

The tappet body 130 may further define a seat 137, which extends from the outer surface 132 to the inner surface 133 (see also FIG. 3). The seat 137 generally defines a seat axis A2 (see FIG. 8) that is perpendicular to and spaced vertically above the aperture axis A1 in one embodiment. The seat 137 has an elongated profile that is configured to receive the beam 128, as described in greater detail below.

In the representative embodiment illustrated herein, the tappet body 130 is formed as a unitary, one-piece component, manufactured from materials such as steel. In the first embodiment of the tappet assembly 108 illustrated in FIGS. 2-11, the tappet body 130 is manufactured by a drawing process. Here, the apertures 138 and the seat 137 may be formed in the tappet body 130 during the drawing process used to form the tappet body 130. However, other machining methods such as drilling and electrical discharge machining (EDM) may also be used. As will be discussed in greater detail below in connection with the embodiments of the tappet assembly depicted in FIGS. 12-16, manufacturing processes other than drawing may be utilized to facilitate forming the tappet body, such as stamping, rolling, and grinding processes.

Referring now to FIGS. 7-9, the follower assembly 126 is arranged in the interior 131 of the tappet body 130 and includes a shaft 142 and at least one bearing 144. In the embodiment shown here, the follower assembly 124 includes first and second bearings, generally indicated at 144A and 144B, respectively. The first and second bearings 144A, 144B are each supported for rotation on the shaft 142. In the representative embodiment illustrated in FIGS. 7-9, the first and second bearings 144A, 144B are realized as roller bearing assemblies. However, those having ordinary skill in the art will appreciate that other configurations of the first and second bearings 144A, 144B are contemplated by the present disclosure (e.g., hydrodynamic journal bearings).

Figure 4:
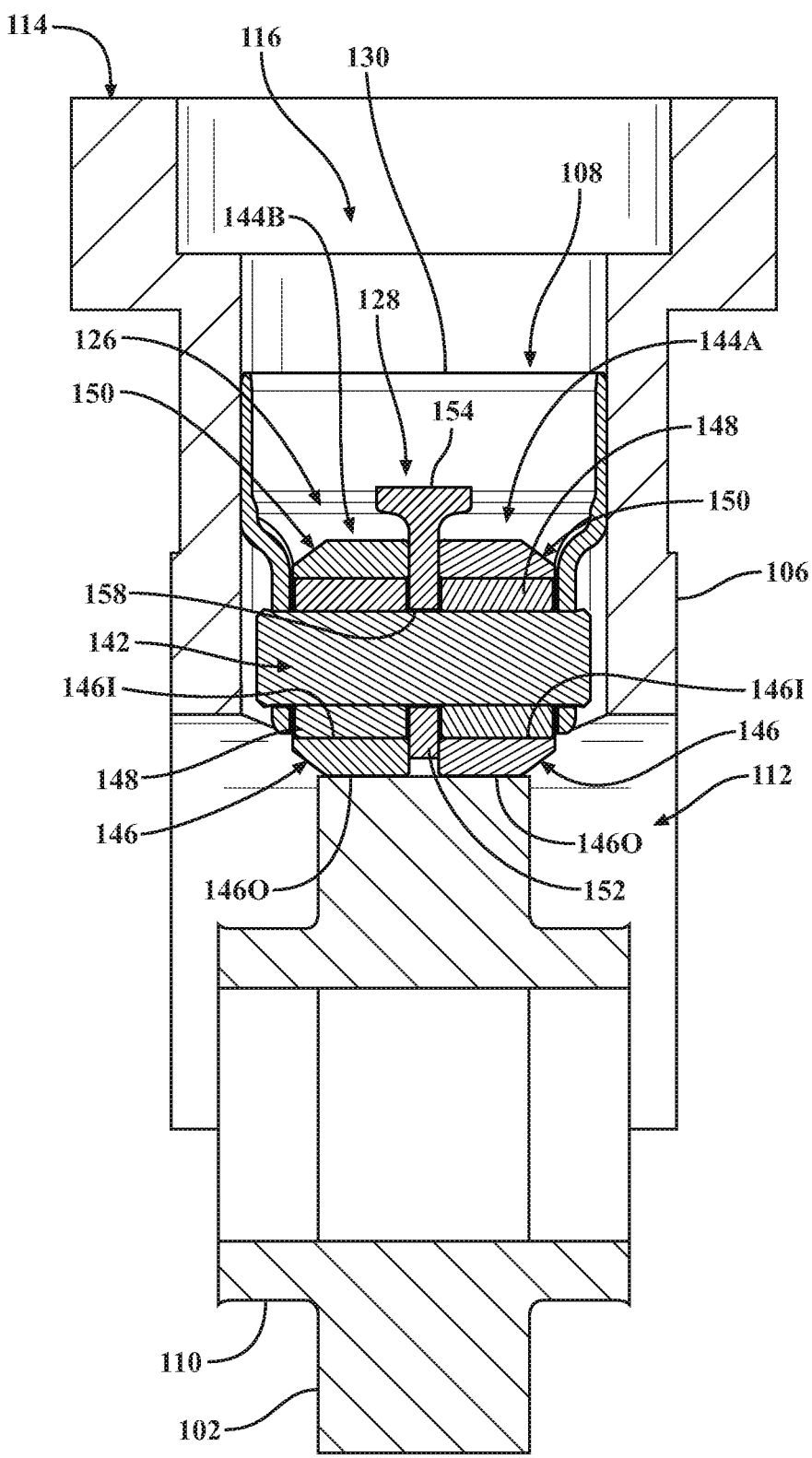
FIG. 4 is a section view taken along line 4-4 in FIG. 2, shown depicting portions of the housing, the tappet assembly, and the camshaft lobe.

With continued reference to FIGS. 2-9, the first and second bearings 144A, 144B each protrude toward the camshaft 110 from the second end 135 of the tappet body 130 so as to engage the camshaft lobe 102 and follow the profile of the camshaft lobe 102 as the camshaft 110 rotates in operation (see FIGS. 3-4). Here, rotation of the camshaft 110 is translated into reciprocal movement of the tappet assembly 108 within the tappet cylinder 116 as the first and second bearings 144A, 144B of the follower assembly 126 roll along the profile of the camshaft lobe 102. The follower assembly 126 is disposed in the beam 128 which, in turn, is supported by the tappet body 130 and is interposed between the first bearing 144A and the second bearing 144B along the shaft 142. As will be appreciated from the subsequent description below, the follower assembly 126, the beam 128, and/or the tappet body 130 can be configured in a number of different ways, such as to accommodate different application requirements of correspondingly different high-pressure fuel systems 100, without departing from the scope of the present invention.

Those having ordinary skill in the art will appreciate that various application-specific requirements (e.g., reciprocating mass, load, geometry, packing requirements, and the like) may necessitate that one or more components of the tappet assembly 108 be configured in certain ways so as to ensure that the high-pressure fuel system 100 operates consistently and reliably. Here, different materials and/or manufacturing processes may be employed to promote the reduction of contact stresses, such as by increasing contact area between two surfaces. By way of illustrative example, by maximizing the width of each of the first and second bearings 144A, 144B of the follower assembly 126, contact stress occurring between the respective bearings 144A, 144B and the shaft 142 may be reduced.

Figure 11:
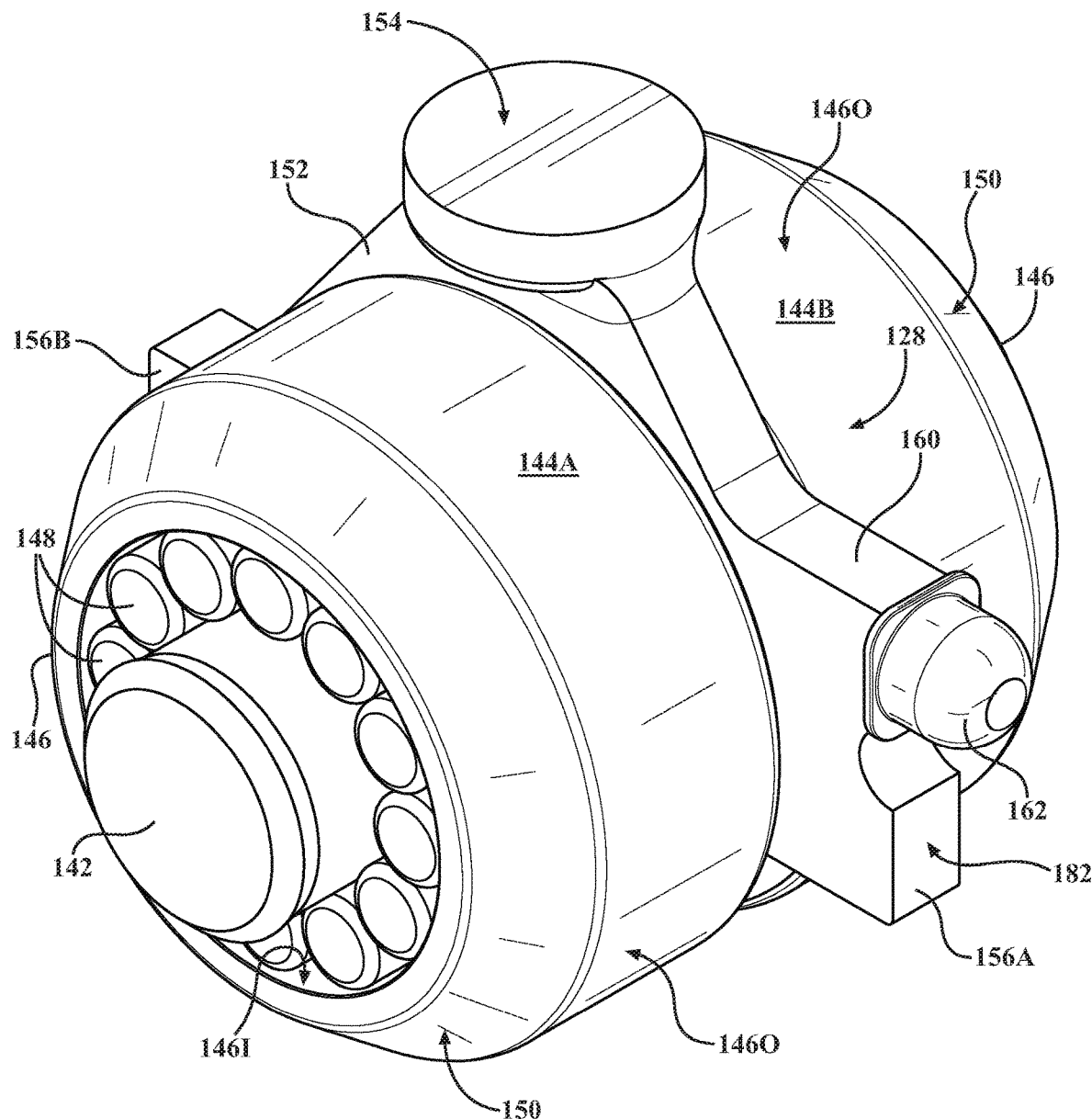
FIG. 11 is a perspective view of the follower assembly of FIG. 6 with the tappet body removed.

In the representative embodiment of the tappet assembly 108 depicted in FIGS. 2-11, the first and second bearings 144A, 144B of the follower assembly 126 each include an outer race 146, which is adapted to engage the camshaft lobe 102, and a plurality of rollers 148 arranged between the outer race 146 and the shaft 142 (see FIG. 11). The rollers 148 reduce friction and help distribute load between the shaft 142 and the first and second bearings 144A, 144B during operation. The outer race 146 comprises an outer portion 1460 that is adapted to at least partially engage the camshaft lobe 102, and an inner portion 1461 that is adapted to engage the rollers 148. In some embodiments of the present disclosure, including without limitation the first embodiment of the tappet assembly 108 illustrated in FIGS. 2-11, each of the first and second bearings 144A, 144B may have a chamfered edge 150 to provide clearance for the bearings 144A, 144B between the inner surface 133 of the tappet body 130 adjacent the respective apertures 138 and indented walls 136. The chamfered edges 150 of the bearings 144A, 144B face away from each other in the illustrated embodiment such that the bearings 144A, 144B have a generally asymmetric profile.

Here in the first embodiment of the tappet assembly 108, and as is best shown in FIG. 4, the chamfered edge 150 is formed on one side of the outer portion 148 of the outer race 146 of each of the bearings 144A, 144B (a smaller chamfer may be provided on the other side of the outer portion 148 in some embodiments; not shown in detail). This configuration allows the width of the outer portion 1460 to maximize contact with the camshaft lobe 102 while still facilitating packaging of the follower assembly 126 within the tappet body 130 and, at the same time, allows both the width of the inner portion 1461 and the length of the rollers 148 to be maximized so as to distribute load across a maximized length of the shaft 142 while generally reducing the rotating mass of the bearings 144A, 144B.

With continued reference to FIGS. 8 and 11, the beam 128 of the follower assembly 126 includes a central portion 152, a platform 154, and first and second arms 156A, 156B. The platform 154 is formed on the central portion 152 of the beam 128 and provides a contact surface that is arranged to engage the spring-loaded piston 122 of the high-pressure fuel pump assembly 104 in force translating relationship (see FIG. 5; engagement not shown). Each of the first arm 156A and the second arm 156B extends in opposite directions away from the central portion 152 to a lateral engagement surface 182. The lateral engagement surface 182 engages the inner surface 133 of the tappet body 130 to laterally constrain the beam 128 in the interior 121. Each of the arms 156A, 156B of the beam 128 has a generally rectangular profile having an axial engagement surface 180, which is configured to engage or otherwise be supported by one of the respective first and second shelves 140A, 140B of the tappet body 130. Specifically, the axial engagement surfaces 180 engage the support surfaces 172 of the shelves 140A, 140B. The beam 128 is further constrained within the tappet body 130 by the wall portions 178, which engage the arms 156A, 156B to prevent lateral movement parallel to the aperture axis A1.

A bore 158 is further formed in the central portion 152 to receive the shaft 142 of the follower assembly 126. The bore 158 has a diameter larger than the shaft 142 such that there is clearance therebetween. The platform 154 is disposed above the arms 156A, 156B and spaced from the bore 158 such that the platform 154 is spaced above the bearings 144A, 144B and extends outwardly toward the tappet body 130, allowing the contact surface between the spring-loaded piston 122 of the high-pressure fuel pump assembly 104 to be enlarged.

The beam 128 may further comprise a protrusion 160 arranged above the arms 156A, 156B that extends outwardly from the central portion 152 toward the tappet body 130. The protrusion 160 may be arranged between the aperture axis A1 and the first end of the tappet body 130. Said differently, the protrusion 160 may protrude from the central portion 152 at a point above a centerline of the shaft 142. The protrusion 160 may comprise a guide tip 162 extending from a distal end of the protrusion 160 and through the seat 137 to protrude from the outer surface 132 of the tappet body 130. When the beam 128 is seated in the seat 137 of the tappet body 130, the guide tip 162 protrudes beyond the outer surface 132 of the tappet body 130 to be received in and travel along the guide slot 118 of the housing 106 (see FIG. 3). This configuration aligns the tappet assembly 108 within the tappet cylinder 116 to prevent rotation of the tappet assembly 108 with respect to the camshaft lobe 102 and the high-pressure fuel pump assembly 104. The guide tip 162 may have a circular profile that is complementary to the profile of the seat 137 for reducing contact stresses during use. In some embodiments the protrusion 160 may be flared at the distal end to limit the distance that the guide tip 162 may protrude from the outer surface 132.

Referring now to FIG. 9, during operation, the bearings 144A, 144B follow the profile of the camshaft lobe 102, the tappet assembly 108 reciprocates within the tappet cylinder 116 to transfer motion to the high-pressure fuel pump assembly 104. To move the tappet assembly 108 upwards (i.e. to pressurize the fuel system 100), the camshaft 110 translates force to the spring-loaded piston 122 along a first force path 186, a second force path 188, and a third force path 190. Specifically, force is translated from the camshaft lobe 102 through the bearings 144A, 144B and rollers 148, along the shaft 142, and to each of the apertures 138 of the tappet body 130 in the first force path 186. In the second force path 188, force is translated through the tappet body 130 from the apertures 138 to the shelves 140A, 140B, which engage the support surfaces 172 of the arms 156A, 156B at the corresponding axial engagement surfaces 180. In the third force path 190, force is translated through the beam 128 from the arms 156A, 156B to the platform 154, which engages the spring-loaded piston 122 and operates the high-pressure fuel pump 104.

Continued rotation of the camshaft 110 causes the camshaft lobe 102 to move away from the high-pressure fuel pump 104. The spring-loaded piston 122 translates force along the third force path 190 to the beam 128 via engagement with the platform 154. Force is translated through the beam 128 to the arms 156A, 156B along the second force path 188 to the respective shelves 140A, 140B via engagement between the support surfaces 172 and the axial engagement surfaces 180. Finally, force is translated through the tappet body 130 to the shaft 142 and bearings 144A, 144B along the first load path 186, which causes the tappet assembly 108 to move away from the high-pressure fuel pump 104 and maintain engagement with the camshaft lobe 102. Because the force paths 186, 188, 190 extend through the follower assembly 126, the beam 128, and the tappet body 130, each of these elements is stressed during operation. Furthermore, by translating force through each element, excessive free play (i.e. uncontrolled or unconstrained movement) may be reduced, which in turn may reduce noise, vibration, and/or harshness that may otherwise occur during operation.

As is best shown in FIG. 4, the central portion 152 of the beam 128 is interposed axially between the first and second bearings 144A, 144B. Here, the bore 158 of the beam 128 is aligned with the apertures 138 of the tappet body 130 and with the shaft 142. Thus, the shaft 142 extends through the apertures 138, the first and second bearings 144A, 144B, and the bore 158 of the beam 128. The shaft 142 may be retained relative to the tappet body 130 by deforming opposing ends of the shaft 142 to a diameter larger than the apertures 138. Each end may be deformed by staking, flaring, or otherwise effectively enlarging opposing ends of the shaft 142 to a size larger than the apertures 138. The shaft 142 is retained axially in the tappet body 130 but may be able to rotate relative to the apertures 138 and the beam 128. More specifically, the clearance between the shaft 142 and the beam 128 prevents axial forces from being transferred therebetween. The indented walls 136 provide clearance between the enlarged opposing ends of the shaft 142 and the tappet cylinder 116. However, other configurations are contemplated, and those having ordinary skill in the art will appreciate that the shaft 142 could be configured in any suitable way sufficient to be retained and engage the beam 128, as noted above, without departing from the scope of the present invention.

In the embodiments illustrated herein, the beam 128 of the follower assembly 126 is formed as a unitary, one-piece component. More specifically, in the first embodiment of the tappet assembly 108 illustrated in FIGS. 2-11, the beam 128 is manufactured from a single piece of steel that has been stamped and contoured to shape. In some embodiments, the platform 154 of the beam 128 may be formed with a coining operation to enlarge the contact surface, which is arranged to engage against the spring-loaded piston 122 of the high-pressure fuel pump assembly 104. It is contemplated that other manufacturing processes may be utilized for certain applications, such as casting, forging, metal injection molding, powdered metal sintering, and the like.

When the tappet assembly 108 is installed into the tappet cylinder 116 of the housing 106, and the high-pressure fuel pump assembly 104 is operatively attached to the flange 114 of the housing 106, the spring-loaded piston 122 engages against the platform 154 of the beam 128 with the follower assembly 126 engaging the camshaft lobe 102. The camshaft lobe 102 urges the follower assembly 126 toward the high-pressure fuel pump assembly 104, where forces are transferred from each of the first and second bearings 144A, 144B to the shaft 142 and apertures 138, through the tappet body 130 to the beam 128, and to the spring-loaded piston 122 of the high-pressure fuel pump assembly 104.

As discussed above, engagement between the arms 156A, 156B and the shelves 140A, 140B effects concurrent movement of the beam 128 and the tappet body 130 as the tappet assembly 108 reciprocates within the tappet cylinder 116. Specifically, as the spring-loaded piston 122 moves the follower assembly 126 toward the camshaft lobe 102, the arms 156A, 156B transfer movement from the beam 128 to the shelves 140A, 140B to move the tappet body 130 within the tappet cylinder 116.

As noted above, a second embodiment of the tappet assembly of the present invention is shown in FIGS. 12-16. As will be appreciated from the subsequent description below, the second embodiment is similar to the first embodiment of the tappet assembly 108 described above in connection with FIGS. 2-11. As such, the components and structural features of the second embodiment of the tappet assembly that are the same as or that otherwise correspond to the first embodiment of the tappet assembly 108 are provided with the same reference numerals increased by 100. While the specific differences between these embodiments will be described in detail, for the purposes of clarity and consistency, only certain structural features and components common between these embodiments will be discussed and depicted in the drawing(s) of the second embodiment of the tappet assembly 208. Here, unless otherwise indicated, the above description of the first embodiment of the tappet assembly 108 may be incorporated by reference with respect to the second embodiment of the tappet assembly 208 without limitation.

Figure 12:
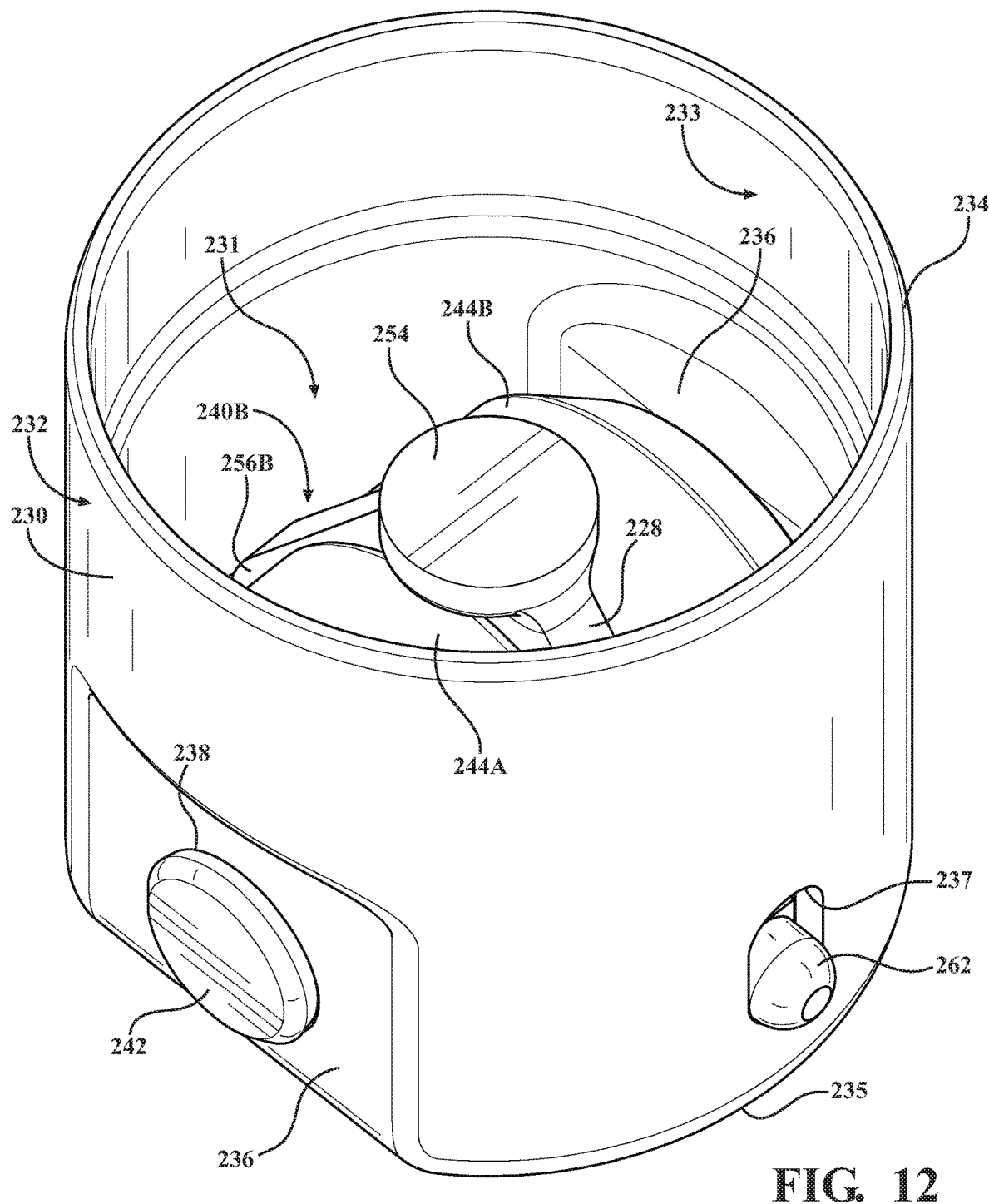
FIG. 12 is a perspective view of a second embodiment of the tappet assembly according to the present invention.
Figure 13:
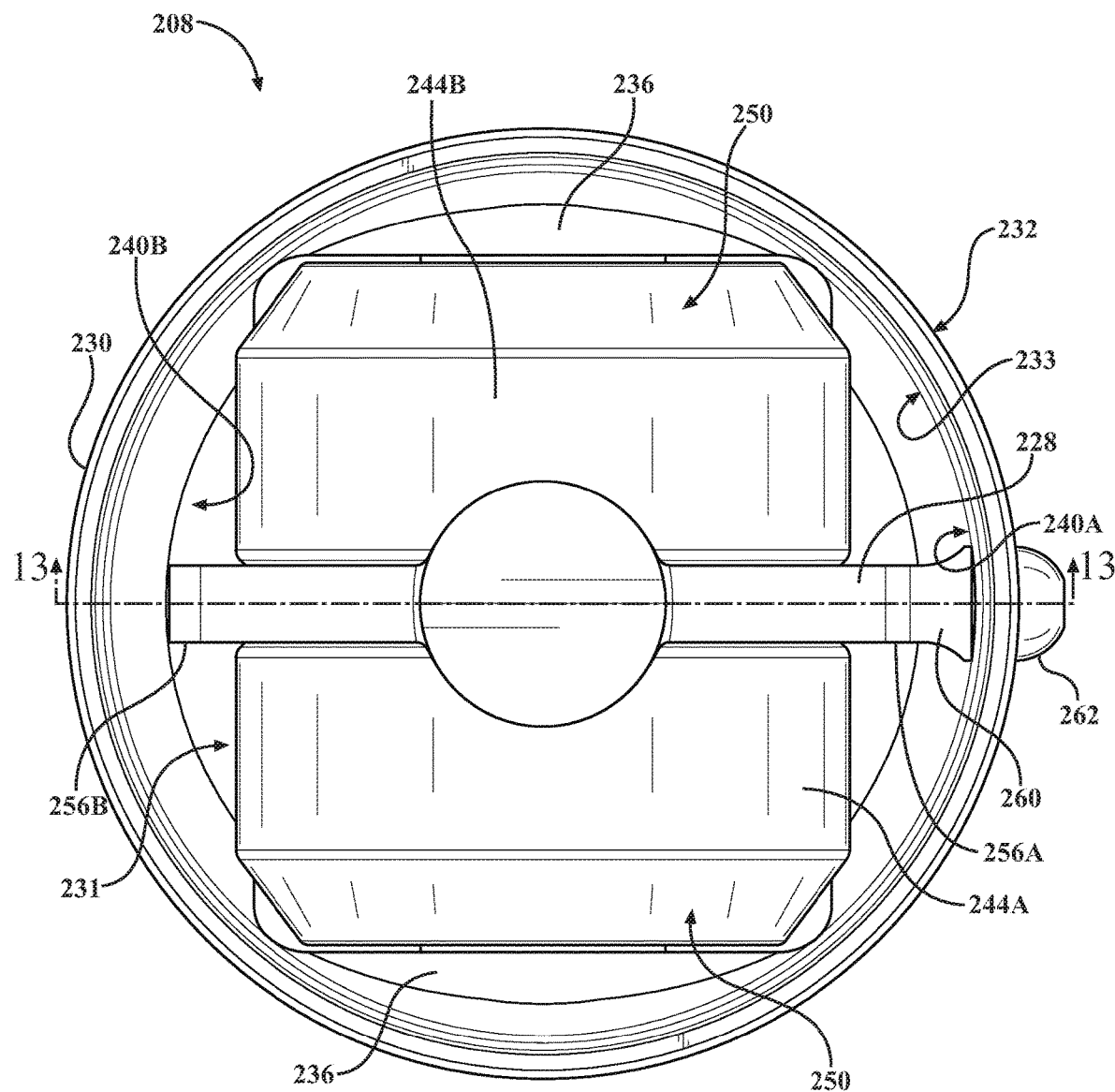
FIG. 13 is a top-side plan view of the second embodiment of the tappet assembly of FIG. 12, shown having a follower assembly supported within a tappet body.

Referring now to FIGS. 12 and 13, the second embodiment of the tappet assembly 208 is shown. In this embodiment, the tappet body 230 has an outer surface 232 and an inner surface 233, each of which have a generally annular profile to define a tubular shape of the tappet body 230 and an interior 231. The tappet body 230 extends between a first end 234 and a second end 235, the first end 234 oriented toward the high-pressure fuel pump assembly 104 and the second end 235 oriented toward the camshaft 110.

Figure 14:
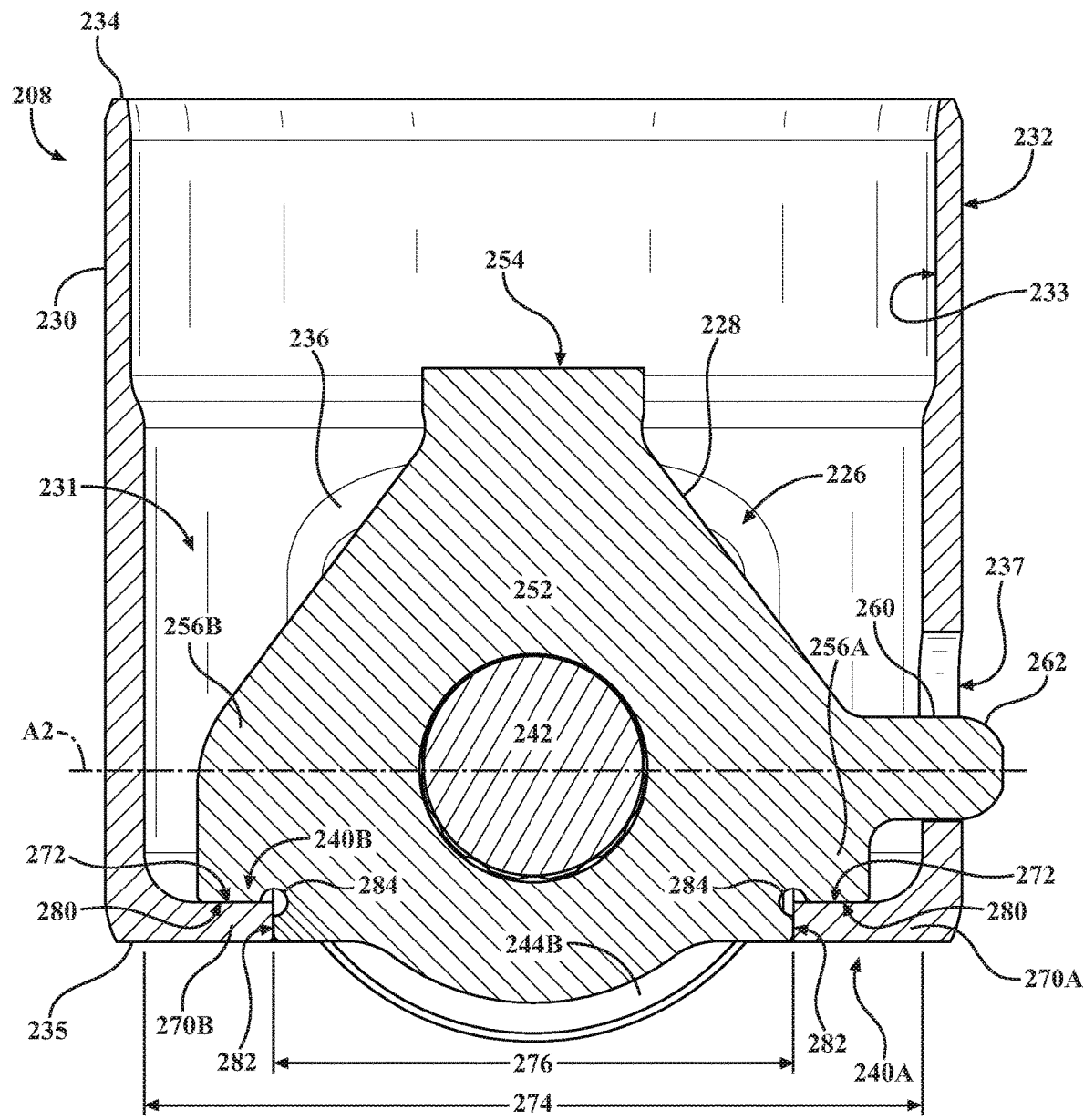
FIG. 14 is a cross-sectional view of the second embodiment of the tappet assembly taken along like 14-14 of FIG. 13.
Figure 15:
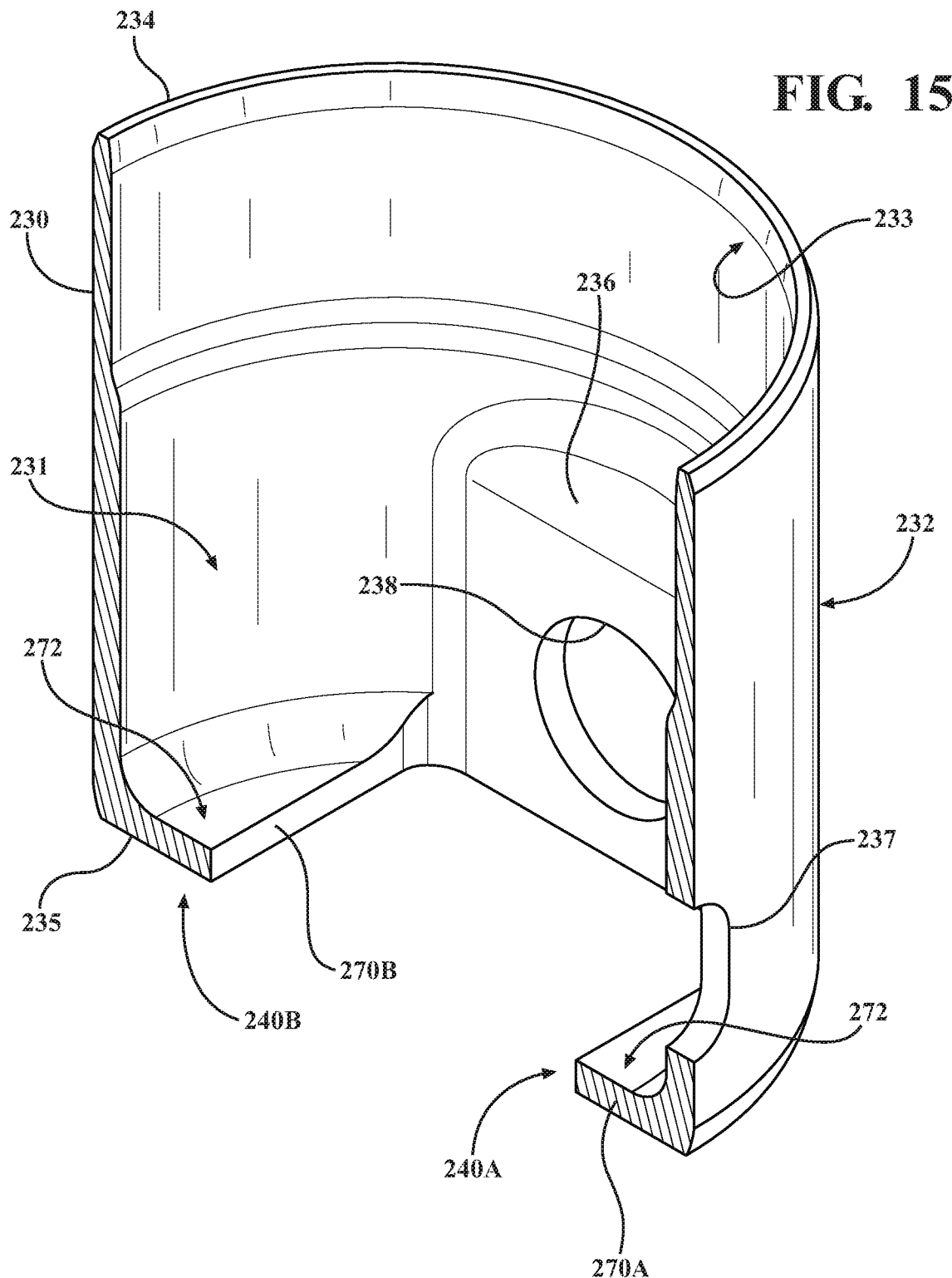
FIG. 15 is a cross-sectional perspective view of the tappet body of FIG. 14 with the follower assembly removed.

In FIGS. 14 and 15, the interior 231 of the tappet body 230 is shown including at least one shelf 240A, 240B adjacent to the second end 235. Here, the at least one shelf is further defined as a first shelf 240A and a second shelf 240B, each shelf 240A, 240B arranged on an opposing since of the tappet body 230. The first shelf 240A and the second shelf 240B each protrude from the inner surface 233 of the tappet body 230 into the interior 231. The interior 235 of the tappet body 230 defines a first width 274 between opposing sides of the inner surface 233, i.e. 180° from each other. A second width 276 is defined between the first shelf 240A and the second shelf 240B, the second width 276 is less than the first width 274. Said differently, the shelves 240A, 240B reduce an inner diameter of the tappet body 230 at the second end 235.

In the second embodiment, the shelves 240A, 240B are formed at the second end 235 of the tappet body 230 and each shelf 240A, 240B includes a shelf body 270A, 270B and a support surface 272. Here, each shelf 240A, 240B may be formed by a drawing process concurrent with the formation of the tappet body 230. In this way, the shelf body 270A, 270B protrudes from the inner surface 233 of the tappet body 230 such that the support surface 272 is continuous with the inner surface 233. Alternatively, the shelves 240A, 240B may be formed following the drawing process by stamping, which removes material between each shelf 240A, 240B forming the second width 276.

Figure 16:
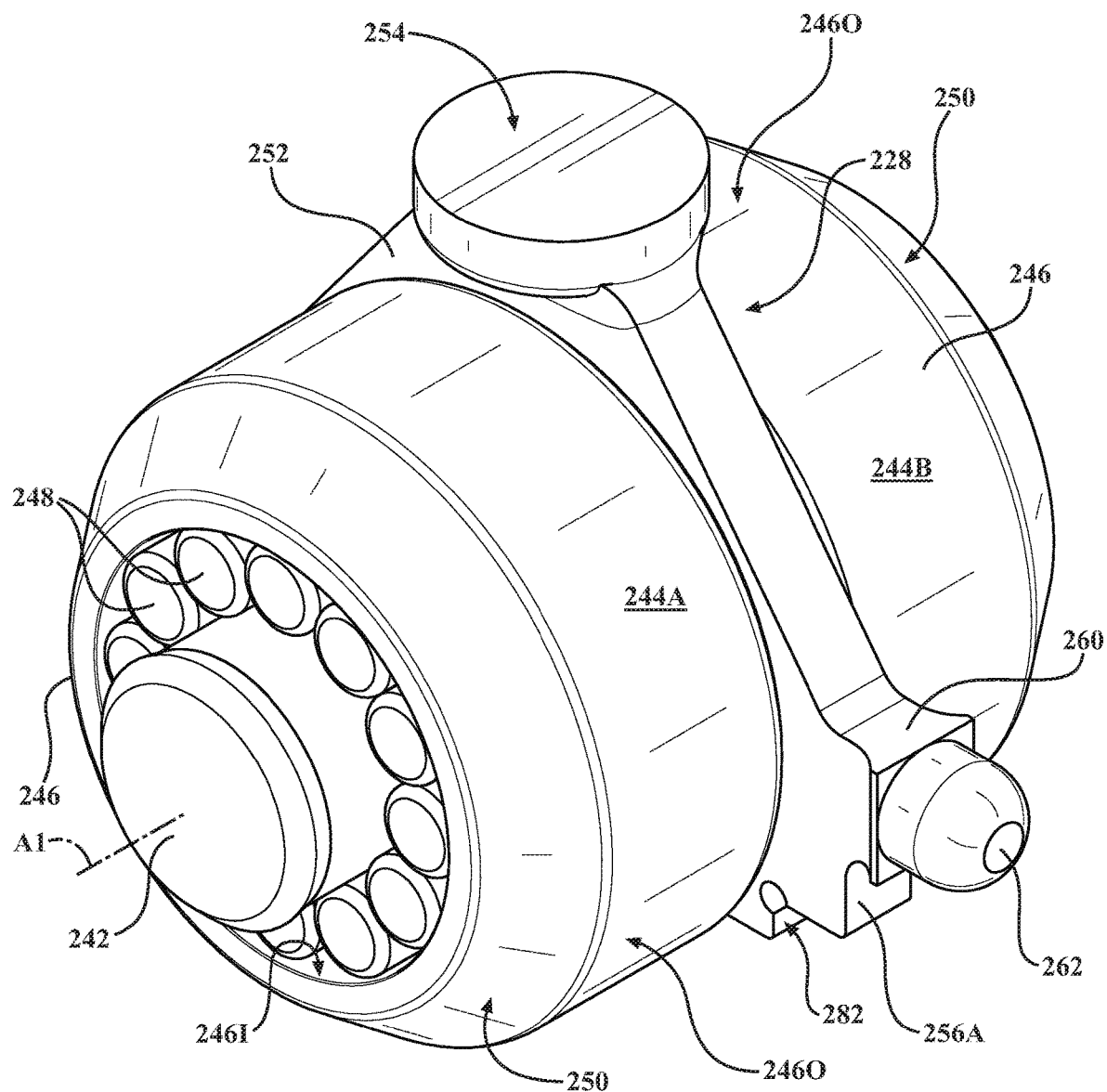
FIG. 16 is a perspective view of the follower assembly of FIG. 12 with the tappet body removed.

Turning to FIGS. 14 and 16, the beam 228 of the follower assembly 226 includes a central portion 252, a platform 254, and first and second arms 256A, 256B. The platform 254 is formed on the central portion 252 of the beam 228 and provides a contact surface that is arranged to engage the spring-loaded piston 122 of the high-pressure fuel pump assembly 104 in force translating relationship (see FIG. 5; engagement not shown). Each of the first arm 256A and the second arm 256B extends from the central portion 252 and generally away from the platform 254 in opposing directions. Each of the arms 256A, 256B of the beam 228 has a generally rectangular profile and is configured to engage or otherwise be supported by one of the respective first and second shelves 240A, 240B of the tappet body 230 (see FIGS. 14 and 15). Each of the arms 256A, 256B may have an axial engagement surface 280 and a lateral engagement surface 282, which may be separated by a notch. The axial engagement surface 280 is arranged perpendicular to reciprocating movement of the tappet assembly 208. Said differently, the axial engagement surface 280 is oriented perpendicular to the force applied to the platform 254 by the spring-loaded piston 122 for transferring force from the beam 228 to the tappet body 230. The axial engagement surfaces 280 engage the support surfaces 272 of the tappet body 230. The lateral engagement surface 282 on each arm 256A, 256B engages the respective shelf 240A, 240B to constrain the beam 228 within the tappet body 230. The lateral engagement surfaces 282 prevent lateral movement parallel to the aperture axis A1. The notches 284 between the respective lateral engagement surfaces 282 and axial engagement surfaces 280 reduce stresses imparted on the beam 228 during operation. Additionally, the notches provide clearance for the shelves 140A, 140B to engage the axial engagement surfaces 280 and the lateral engagement surfaces 282.

In a manner similar to that described above in connection with FIG. 9 and the force paths 186, 188, 190, during operation of the high-pressure fuel system 100, the tappet assembly 208 reciprocates in the tappet cylinder 116. The camshaft lobe 102 moves the bearings 244A, 244B toward the fuel pump 104, which in turn move the shaft 242 in the same direction within the tappet cylinder 116. Contact between the shaft 242 and the tappet body 230 at the apertures 238 likewise causes coordinated movement of the tappet body 230. Movement of the tappet body 230 is transferred to the beam 228 through the engagement of the arms 256A, 256B and the corresponding shelves 240A, 240B. More specifically, contact between the support surface 272 and the axial engagement surface 280 allows for force to be translated from the tappet body 230 to the beam 228.

A bore 258 is further formed in the central portion 252 and is configured to receive the shaft 242 of the follower assembly 226. The bore 258 has a diameter larger than the shaft 242 such that there is clearance therebetween. The platform 254 is disposed above the arms 256A, 256B and spaced from the bore 258 such that the platform 254 is spaced above the bearings 244A, 244B and extends outwardly toward the tappet body 230, allowing the contact surface between the spring-loaded piston 122 of the high-pressure fuel pump assembly 104 to be enlarged.

The beam 228 may further comprises a protrusion 260 arranged at a distal end of one of the arms 256A, 256B and extending outwardly therefrom toward the tappet body 230. The protrusion 260 may be arranged at a height that is aligned with the aperture axis A1. Said differently, the protrusion 260 may protrude from the distal end of the arm 256A at a height that is aligned with a centerline of the shaft 242. The protrusion 260 may comprise a guide tip 262 extending from a distal end of the protrusion 260 and through the seat 237 to protrude from the outer surface 232 of the tappet body 230. When the beam 228 is seated in the seat 237 of the tappet body 230, the guide tip 262 protrudes beyond the outer surface 232 of the tappet body 230 to be received in and travel along the guide slot 118 of the housing 106 (see FIG. 3). This configuration aligns the tappet assembly 208 within the tappet cylinder 116 to prevent rotation of the tappet assembly 208 with respect to the camshaft lobe 102 and the high-pressure fuel pump assembly 104. The guide tip 262 may have a circular profile that is complementary to the profile of the seat 237 for reducing contact stresses during use. In some embodiments the protrusion 260 may be flared at the distal end to limit the distance that the guide tip 262 may protrude from the outer surface 232.

Those having ordinary skill in the art will appreciate that various aspects, components, and/or structural features of the nine embodiments described herein can be combined, interchanged, or otherwise implemented with one another to accommodate various applications.

In this way, the embodiments of the tappet assembly of the present invention significantly reduce the cost and complexity of manufacturing and assembling high-pressure fuel systems 100 and associated components. Specifically, it will be appreciated that the cooperation between the beam, the bearings, and the shaft of the follower assembly, and the tappet body promote reduced mass and increased stiffness without compromising performance. Further, it will be appreciated that the embodiments of the tappet assembly of the present invention afford opportunities for high-pressure fuel systems 100 with superior operational characteristics, such as reduced noise, vibration and harmonics during operation, as well as improved performance, component life and longevity, efficiency, weight, load and stress capability, and packaging orientation.

The invention has been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A tappet assembly for use in translating force between a camshaft lobe and a fuel pump assembly via reciprocal movement within a tappet cylinder having a guide slot, said tappet assembly comprising:
 a tappet body extending between a first end and a second end, said first end oriented toward the fuel pump assembly and said second end oriented toward the camshaft lobe, wherein said tappet body includes a shelf adjacent to said second end and further defines a pair of apertures;
 a follower assembly including a shaft disposed in said pair of apertures of said tappet body and a first bearing and a second bearing each disposed on said shaft for engaging the camshaft lobe; and
 a beam disposed on said shaft between said first bearing and said second bearing and having a platform for engaging the fuel pump assembly, wherein said beam engages said shelf of said tappet body for transferring force from the fuel pump assembly to the camshaft lobe.

2. The tappet assembly of claim 1, wherein said tappet body has an inner surface and an outer surface that define a tubular shape and an interior, wherein said shelf protrudes from said inner surface into said interior.

3. The tappet assembly of claim 2, wherein said follower assembly is arranged in said interior of said tappet body.

4. The tappet assembly of claim 2, wherein said shelf has a shelf body and a support surface, wherein said shelf body is coupled to said second end of said tappet body and extends toward said first end to said support surface.

5. The tappet assembly of claim 4, wherein said shelf further comprises a wall portion extending from said support surface adjacent to said beam to prevent movement of said beam relative to said shelf.

6. The tappet assembly of claim 4, wherein said shelf is further defined as two shelves arranged on opposite sides of said tappet body, said tappet body defining a first width between said inner surface of said tappet body and a second width between said shelves, and wherein said second width is less than said first width.

7. The tappet assembly of claim 2, wherein said tappet body is folded to define said second end and to form said shelf.

8. The tappet assembly of claim 2, wherein said tappet body further defines a seat and wherein said beam is at least partially received in said seat.

9. The tappet assembly of claim 8, wherein said beam comprises a central portion and a protrusion extending therefrom, wherein said protrusion is received in said seat.

10. The tappet assembly of claim 9, wherein said beam further comprises a pair of arms, extending from opposing sides of said central portion, wherein said pair of arms engage said shelf of said tappet body.

11. The tappet assembly of claim 9, wherein said beam further comprises a guide tip extending from said protrusion and protruding through said outer surface of said tappet body for engaging the guide slot of the tappet cylinder.

12. The tappet assembly of claim 11, wherein said pair of apertures define an aperture axis, wherein said aperture axis is arranged between said first end of said tappet body and said shelf.

13. The tappet assembly of claim 12, wherein said protrusion is arranged between said aperture axis and said first end of said tappet body.

14. The tappet assembly of claim 12, further comprising two indented walls formed in said tappet body, each indented wall defining one of said pair of apertures.

15. The tappet assembly of claim 8, wherein said platform is spaced from said first bearing and said second bearing and extends outwardly toward said tappet body.

16. The tappet assembly of claim 8, wherein said first and second bearings protrude from said second end of said tappet body for engaging the camshaft lobe.

17. The tappet assembly of claim 1, wherein each of said first bearing and said second bearing comprises an outer race and a plurality of rollers, said plurality of rollers arranged between said outer race and said shaft.

18. The tappet assembly of claim 1, wherein said beam comprises a pair of arms, each of said pair of arms having an axial engagement surface and a lateral engagement surface, wherein said axial engagement surface and said lateral engagement surface each engaging said shelf.

19. The tappet assembly of claim 18, wherein said axial engagement surface and said lateral engagement surface are arranged perpendicular to each other.

20. The tappet assembly of claim 18, wherein a notch is defined between said axial engagement surface and said lateral engagement surface.

* * * * *